United States Patent
Sakaue et al.

(10) Patent No.: US 12,164,459 B2
(45) Date of Patent: Dec. 10, 2024

(54) USB CONNECTION CONTROL SYSTEM, USB CONNECTION CONTROL METHOD, USB-NETWORK CONVERSION DEVICE AND PROGRAM

(71) Applicant: Nippon Telegraph and Telephone Corporation, Tokyo (JP)

(72) Inventors: Yuki Sakaue, Musashino (JP); Tatsuya Fukui, Musashino (JP); Ryota Shiina, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 51 days.

(21) Appl. No.: 18/010,968

(22) PCT Filed: Jun. 23, 2020

(86) PCT No.: PCT/JP2020/024492
§ 371 (c)(1),
(2) Date: Dec. 16, 2022

(87) PCT Pub. No.: WO2021/260779
PCT Pub. Date: Dec. 30, 2021

(65) Prior Publication Data
US 2023/0222083 A1    Jul. 13, 2023

(51) Int. Cl.
*G06F 13/42*    (2006.01)
(52) U.S. Cl.
CPC .. *G06F 13/4282* (2013.01); *G06F 2213/0042* (2013.01)
(58) Field of Classification Search
CPC ...................................................... G06F 3/1288
See application file for complete search history.

(56) References Cited

U.S. PATENT DOCUMENTS 10,838,900 B2 * 11/2020 Liao ..................... H04N 21/426
2016/0227605 A1 *  8/2016 Wu ......................... H04L 69/18

OTHER PUBLICATIONS

[No Author Listed], "Universal Serial Bus 3.2 Specification," 2017 USB 3.0 Promoter Group, Sep. 22, 2017, Revision 1.0, p. 247.

* cited by examiner

*Primary Examiner* — Henry Tsai
*Assistant Examiner* — Juanito C Borromeo
(74) *Attorney, Agent, or Firm* — Fish & Richardson P.C.

(57) ABSTRACT

The present disclosure aims to enable a total of 127 or more USB devices to be connected on the same network regardless of connection sites.
A USB connection control system of the present disclosure is a USB connection control system including a plurality of USB-network conversion devices and a management device being connected to each other via a network, in which the management device holds, per user, connection information defining a connection destination of a USB device connected to the USB-network conversion device, and at least one of the plurality of USB-network conversion devices receives, from the management device, the connection information corresponding to identification information unique to the at least one of the plurality of USB-network conversion devices and communicates with a to-be-connected USB-network conversion device based on the received connection information, and to establish connection with a USB device that is connected to the to-be-connected USB-network conversion device.

4 Claims, 4 Drawing Sheets

[2]

USB DEVICE MANAGEMENT DATABASE

| ITEM NUMBER | USER | USB-ID | USB-NETWORK CONVERSION DEVICE ID TO WHICH USB-ID BELONGS | TO-BE-CONNECTED USB-ID | USB-NETWORK CONVERSION DEVICE ID TO WHICH TO-BE-CONNECTED USB-ID BELONGS |
|---|---|---|---|---|---|
| 1 | A | 1 | 1 | 1 | 2 |
| 2 | A | 2 | 1 | 2 | 2 |
| 3 | A | 1 | 2 | 1 | 1 |
| 4 | A | 2 | 2 | 2 | 1 |
| ... | ... | ... | ... | ... | ... |
| 127 | A | 1 | M | 1 | M' |
| 128 | B | 3 | 1 | N | 2 |
| 129 | B | N | 2 | 3 | 1 |
| ... | ... | ... | ... | ... | ... |
| 254 | B | 1 | L | 1 | L |
| 255 | C | 1 | K | 1 | K |
| ... | ... | ... | ... | ... | ... |

II-1 CONVERSION DEVICE DATABASE #1

| USER | USB-ID | USB-NETWORK CONVERSION DEVICE ID TO WHICH USB-ID BELONGS | TO-BE-CONNECTED USB-ID | USB-NETWORK CONVERSION DEVICE ID TO WHICH TO-BE-CONNECTED USB-ID BELONGS |
|---|---|---|---|---|
| A | 1 | 1 | 1 | 2 |
| A | 2 | 1 | 2 | 2 |
| B | 3 | 1 | N | 2 |

II-2 CONVERSION DEVICE DATABASE #2

| USER | USB-ID | USB-NETWORK CONVERSION DEVICE ID TO WHICH USB-ID BELONGS | TO-BE-CONNECTED USB-ID | USB-NETWORK CONVERSION DEVICE ID TO WHICH TO-BE-CONNECTED USB-ID BELONGS |
|---|---|---|---|---|
| A | 1 | 2 | 1 | 1 |
| A | 2 | 2 | 2 | 1 |
| B | N | 2 | 3 | 1 |

USB CONNECTION CONTROL SYSTEM, USB CONNECTION CONTROL METHOD, USB-NETWORK CONVERSION DEVICE AND PROGRAM

CROSS-REFERENCE TO RELATED APPLICATIONS

This application is a National Stage application under 35 U.S.C. § 371 of International Application No. PCT/JP2020/024492, having an International Filing Date of Jun. 23, 2020.

The disclosure of the prior application is considered part of the disclosure of this application, and is incorporated by reference in its entirety into this application.

TECHNICAL FIELD

The present disclosure relates to a USB connection control system.

BACKGROUND ART

In recent years, with the advancement of cloud/network technology, use of remote servers and personal computers such as telework increases, rather than keeping an expensive high-performance personal computer close at hand, and a user can work no matter where the user is as long as the network is connected.

Further, by a device or equipment with a USB interface such as a printer converting to another network interface such as a USB-LAN conversion device, it is possible to make a USB connection remotely.

On the other hand, USB only allows 127 devices to be connected at the maximum (NPL 1), or the USB-LAN conversion device is fixed, and it is not possible to connect to a remote server or personal computer from the USB device using an unset USB-LAN conversion device.

CITATION LIST

Non Patent Literature

NPL 1: Universal Serial Bus 3.2 Specification, p. 247

SUMMARY OF THE INVENTION

Technical Problem

The present disclosure aims to enable a total of 127 or more USB devices to be connected on the same network regardless of connection sites.

Means for Solving the Problem

A USB connection control system of the present disclosure is
 a USB connection control system including a plurality of USB-network conversion devices and a management device being connected to each other via a network,
 in which the management device holds, per user, connection information that defines a connection destination of a USB device connected to each of the plurality of USB-network conversion devices, and
 at least one of the plurality of USB-network conversion devices receives, from the management device, the connection information corresponding to identification information that is unique to the at least one of the plurality of USB-network conversion devices, and
 communicates with a to-be-connected USB-network conversion device of the plurality of USB-network conversion devices based on the received connection information to establish connection with a USB device that is connected to the to-be-connected USB-network conversion device.

A USB connection control method of the present disclosure is
 a USB connection control method that is executed by a USB connection control system including a plurality of USB-network conversion devices and a management device being connected to each other via a network and includes,
 holding, by the management device, per user, connection information that defines a connection destination of a USB device connected to each of the plurality of USB-network conversion devices,
 receiving, by at least one of the plurality of USB-network conversion devices, from the management device, the connection information corresponding to identification information of the at least one of the plurality of USB-network conversion devices, and
 communicating, by the at least one of the plurality of USB-network conversion devices, with a to-be-connected USB-network conversion device of the plurality of USB-network conversion devices based on the received connection information to establish connection with a USB device that is connected to the to-be-connected USB-network conversion device.

A USB-network conversion device of the present disclosure includes
 a USB connecting port to be connected to a USB device, and
 a conversion device database that holds connection information that defines a connection destination of the USB device connected to the USB connecting port,
 in which communication of the USB device connected to the USB connecting port is converted into a communication protocol of a network where the USB-network conversion device belongs, communication is performed with a to-be-connected USB-network conversion device defined by the conversion device database, and
 connection between the USB device connected to the USB connecting port and the to-be-connected USB-network conversion device is established.

A program of the present disclosure is a program for causing a computer to be implemented as functional units included in the USB-network conversion device according to the present disclosure and for causing the computer to execute steps included in the communication method executed by the USB-network conversion device according to the present disclosure.

Effects of the Invention

According to the present disclosure, a total of 127 or more USB devices can be connected on the same network regardless of connection sites.

BRIEF DESCRIPTION OF DRAWINGS

FIG. 2 illustrates an example of a USB device management database.

FIG. 3 illustrates an example of a conversion device database.

DESCRIPTION OF EMBODIMENTS

Hereinafter, embodiments of the present disclosure will be described in detail with reference to the drawings. Further, the present disclosure is not limited to the embodiments described below. These examples of the embodiments are merely examples, and the present disclosure can be implemented in forms in which various modifications and improvements are added based on knowledge of those skilled in the art. Constituent elements with the same reference signs in the specification and the drawings are assumed to be the same constituent elements to each other.

Overview of Present Disclosure

The present disclosure includes the following configurations.

USB device management gateway

A USB device management gateway functions as a management device and holds information on the USB device and the USB-network conversion device for each user in advance.

USB-network conversion device

The USB-network conversion device receives, from the USB device management gateway, information on the USB device upon connection of the USB device to establish a connection across a network.

System Configuration

Figure 1:
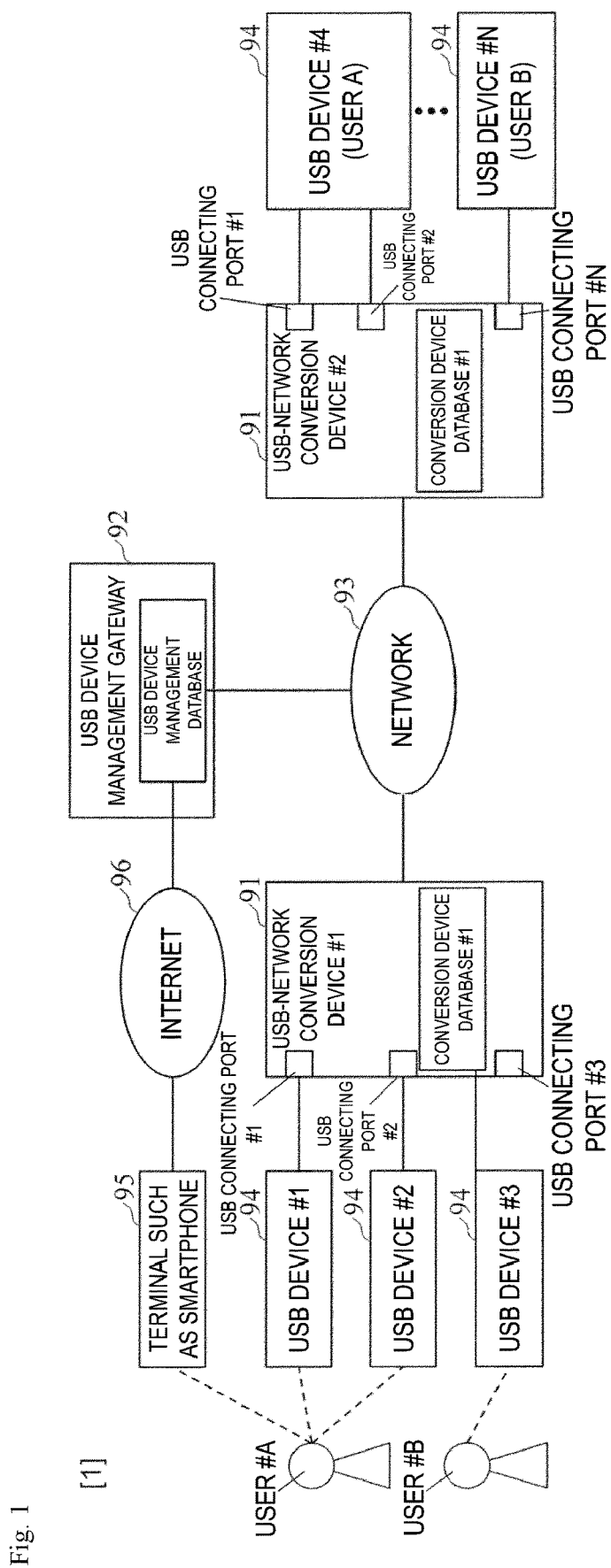
FIG. 1 illustrates an example of a system configuration.

FIG. 1 illustrates an example of a system configuration. In a USB connection control system according to the present embodiment, a plurality of USB-network conversion devices 91#1 and 91#2 and a USB device management gateway 92 are connected via a network 93. In the present embodiment, an example in which the two USB-network conversion devices 91 are connected by the network 93 is illustrated, but the number of the USB-network conversion devices 91 may be any number of two or more.

The USB-network conversion device 91 is any device with a USB interface and includes a computer and a printer. The USB-network conversion device 91 includes a USB connecting port to be connected of a USB device 94. USB devices 94#1, #2, and #3 are connected to the USB-network conversion device 91#1, USB devices 94#4 to 94#N are connected to the USB-network conversion device 91#2, and the USB-network conversion devices 91#1 and 91#2 are connected by the network 93. In the following example, a case where a user #A connects to the USB device 94#4 remotely located across the network will be described.

The USB-network conversion device 91 has any identification information (USB-ID) that is unique for each USB connecting port.

The USB device management gateway 92 holds, in a USB device management database, a user, a USB-ID, a USB-network conversion device ID that brings the USB-ID under control, and connection information that defines a connection destination of the connectable USB-ID. The connection information is registered in the USB device management database in advance from another terminal 95 such as a smartphone via the Internet or the like. The management gateway 92 virtually constructs a connection space of USB-HUB for each user, thereby providing connection of the USB devices 94 of 127 units per user.

The USB device management gateway 92 may include a function of the USB-network conversion device 91. In that case, the USB device management gateway 92 serves as a host, so that the 128-th USB device 94 can be connected.

Each of the USB-network conversion devices 91 has any unique identification information (USB-network conversion device ID). A USB-network conversion device 91 converts the communication of the USB device 94 connected to the USB connecting port into a communication protocol of the network 93 to which the USB-network conversion device 91 belongs and connects to a USB-network conversion device 91 that brings the to-be-connected USB device 94.

When a USB device 94 is connected to a USB-network conversion device 91 for the first time, the USB-network conversion device 91 communicates with the USB device management gateway 92, notifies the USB device management gateway 92 of the USB-ID of the USB connecting port to which the USB device 94 is connected and the USB-network conversion device ID of the USB-network conversion device 91, checks the USB device 94 and the USB-network conversion device ID serving as the connection destinations, and performs network connection.

FIG. 2 illustrates an example of the USB device management database. The USB device management gateway 92 holds the USB device management database. The USB device management database holds all USB-IDs, USB-network conversion device IDs, and USB-IDs and USB-network conversion device IDs serving as the connection destinations, under control of the USB device management database. For example, the connection destination of the USB-ID #1 of the USB-network conversion device ID #1 is the USB-ID #1 of the USB-network conversion device ID #2. The connection destination of the connecting port used by the user and the USB device is registered in the USB device management database in advance. This registration can be set up to 127 devices for each user.

FIG. 3 illustrates an example of a conversion device database. The USB-network conversion device holds all USB-IDs under control of the USB-network conversion device, USB-network conversion device IDs to which the USB-network conversion device belongs, to-be-connected USB-IDs, and USB-network conversion device IDs to which the to-be-connected USB-ID belongs. When the USB-network conversion device ID is common to all the USB-IDs as in the present embodiment, the USB-network conversion device ID may not be held for each USB-ID. The to-be-connected USB-ID and the to-be-connected USB-network conversion device ID are acquired from the USB device management gateway 92 and registered.

Figure 4:
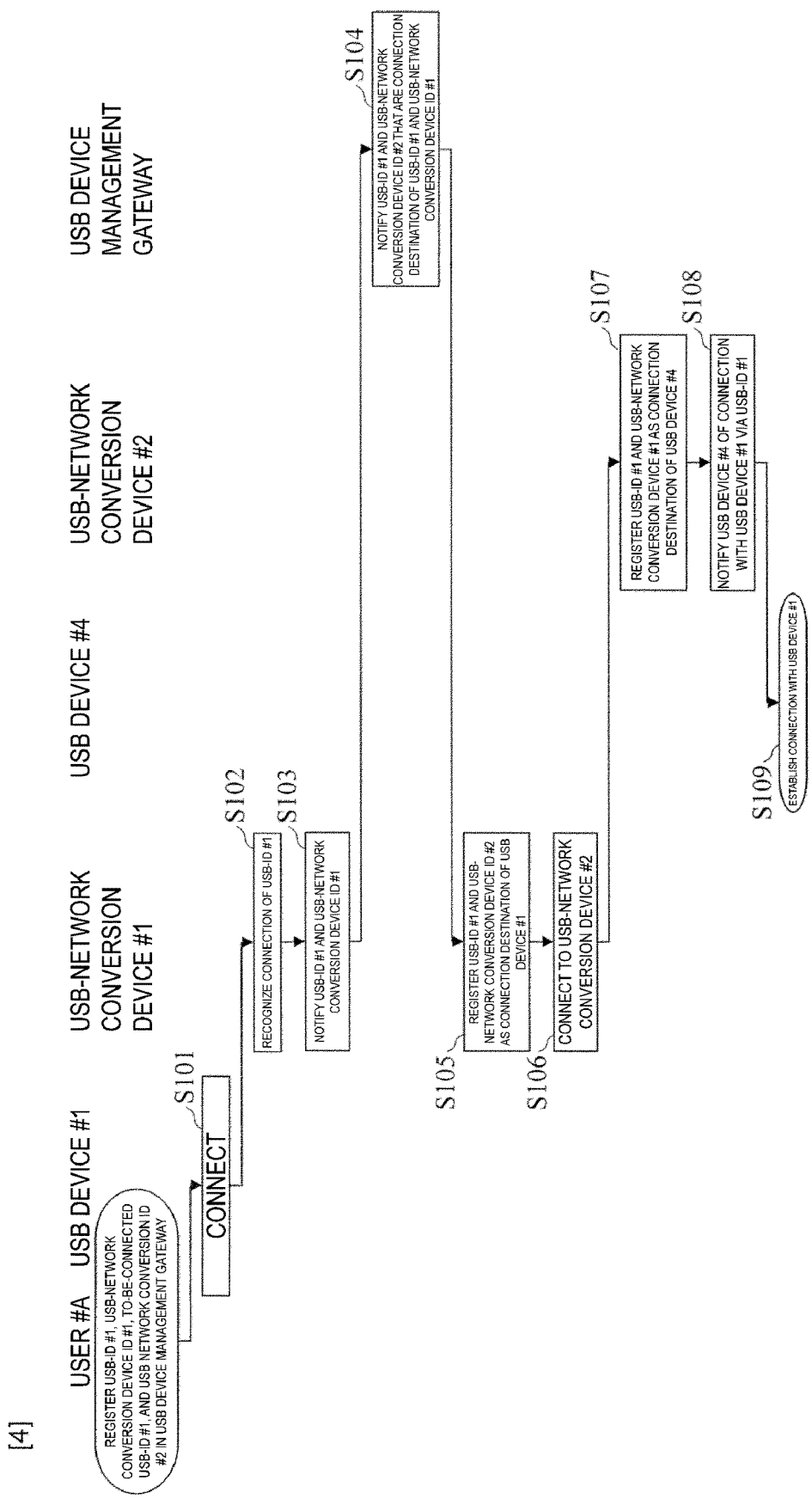
FIG. 4 illustrates an example of a flowchart.

FIG. 4 illustrates an example of a flowchart. A flowchart in a case where the user #A initially connects the USB device 94#1 to the USB-ID #1 of the USB-network conversion device 91#1 will be described below. It is assumed that the USB device 94#4 belonging to the USB-network conversion device 91#2 is already registered in the USB device management gateway 92 and connected.

The USB device 94#1 is connected to the USB-network conversion device 91#1 (S101). The USB-network conversion device 91#1 recognizes connection of the USB-ID #1 (S102) and notifies the USB device management gateway 92 of the USB-ID #1 and the USB-network conversion device ID #1 (S103).

The USB device management gateway 92 acquires the connection destination of the USB-ID #1 and the USB-network conversion device ID #1 from the USB device management database and notifies the USB-network conversion device 91#1 of the connection destination (S104).

For example, the USB device management gateway 92 refers to the USB device management database illustrated in FIG. 2 and notifies the USB-ID #1 of the USB-network conversion device ID #2 as the connection destination of the USB-ID #1 and the USB-network conversion device ID #1. The USB-network conversion device 91#1 registers, in the conversion device database, the USB-ID #1 and the USB-network conversion device ID #2 as the connection destination of the USB device #1 (S105). Then, the USB-network conversion device 91#1 is connected to the USB-network conversion device 91#2 (S106).

The USB-network conversion device 91#2 acquires the USB-network conversion device ID #1 and the USB-ID #1, which are IDs of the USB-network conversion device 91#1, from the USB-network conversion device 91#1 and registers the USB-network conversion device ID #1 and the USB-ID #1 in the conversion device database (S107). Then, the USB-network conversion device 91#2 notifies the USB device 94#4 of connection with the USB device 94#1 via the USB-ID #1 of the USB-network conversion device 91#1 (S108).

The USB device 94#4 establishes the connection with the USB device 94#1 connected to the USB-network conversion device 91#1 (S109).

In the above embodiment, the example of establishing the connection between the USB device 94#1 connected to the USB-network conversion device 91#1 and the USB device 94#4 connected to the USB-network conversion device 91#2 has been described. However, the present disclosure can also be applied to the connection between the USB-network conversion device 91#1 and the USB device 94#4 connected to the USB-network conversion device 91#2.

The apparatus according to the present invention can also be implemented by a computer and a program. The program can be recorded in a recording medium and provided through a network.

INDUSTRIAL APPLICABILITY

The present disclosure can be applied to information and communication industries.

REFERENCE SIGNS LIST

91: USB-network conversion device
92: USB device management gateway
93: Network
94: USB device
95: Terminal

The invention claimed is:

1. A USB connection control system comprising:
a plurality of USB-network conversion devices; and
a management device, the plurality of USB-network conversion devices and the management device being connected to each other via a network,
wherein the management device holds, per user, connection information that defines a connection destination of a USB device connected to each of the plurality of USB-network conversion devices, wherein the connection information defines the connection destination between USB devices connected to the plurality of USB-network conversion devices, and
at least one of the plurality of USB-network conversion devices:
receives, from the management device, the connection information corresponding to identification information that is unique to the at least one of the plurality of USB-network conversion devices, and
communicates with a to-be-connected USB-network conversion device of the plurality of USB-network conversion devices based on the received connection information to establish connection between a USB device of the USB devices that are connected to the at least one of the plurality of USB-network conversion devices and a USB device of USB devices that are connected to the to-be-connected USB-network conversion device.

2. A USB connection control method executed by a USB connection control system including a plurality of USB-network conversion devices and a management device, the plurality of USB-network conversion devices and the management device being connected to each other via a network, the USB connection control method comprising:
holding, by the management device, per user, connection information that defines a connection destination of a USB device connected to each of the plurality of USB-network conversion devices, wherein the connection information defines the connection destination between USB devices connected to the plurality of USB-network conversion devices;
receiving, by at least one of the plurality of USB-network conversion devices, from the management device, the connection information corresponding to identification information of the at least one of the plurality of USB-network conversion devices; and
communicating, by the at least one of the plurality of USB-network conversion devices, with a to-be-connected USB-network conversion device of the plurality of USB-network conversion devices based on the received connection information to establish connection between a USB device of the USB devices that are connected to the at least one of the plurality of USB-network conversion devices and a USB device of USB devices that are connected to the to-be-connected USB-network conversion device.

3. A USB-network conversion device comprising:
a USB connecting port to be connected to a USB device; and
a conversion device database configured to hold connection information that defines a connection destination of the USB device connected to the USB connecting port, wherein the connection destination comprises a to-be-connected USB-network conversion device and a USB device connected to the to-be-connected USB-network conversion device;
wherein communication of the USB device connected to the USB connecting port is converted into a communication protocol of a network where the USB-network conversion device belongs,
communication is performed with the to-be-connected USB-network conversion device defined by the conversion device database, and
connection between the USB device connected to the USB connecting port of the USB-network conversion device and the USB device connected to the to-be-connected USB-network conversion device is established.

4. A non-transitory computer readable medium storing one or more instructions for causing a computer to be implemented as functional units included in the USB-network conversion device according to claim 3.

* * * * *